United States Patent [19]

Oliva, Jr. et al.

[11] Patent Number: 5,428,637
[45] Date of Patent: Jun. 27, 1995

[54] METHOD FOR REDUCING SYNCHRONIZING OVERHEAD OF FREQUENCY HOPPING COMMUNICATIONS SYSTEMS

[75] Inventors: George R. Oliva, Jr., Eatontown; Gregory Lorenzo, Little Silver; Kenneth J. Loffer, Brick, all of N.J.

[73] Assignee: The United States of America as represented by the Secretary of the Army, Washington, D.C.

[21] Appl. No.: 295,343

[22] Filed: Aug. 24, 1994

[51] Int. Cl.⁶ .......................................... H04L 27/30
[52] U.S. Cl. .................................. 375/202; 380/34; 455/49.1
[58] Field of Search ........................ 375/1; 380/34; 455/49.1

[56] References Cited

U.S. PATENT DOCUMENTS

| | | | |
|---|---|---|---|
| 4,558,453 | 12/1985 | Mimken | 375/1 |
| 4,677,617 | 6/1987 | O'Connor et al. | 375/1 X |
| 5,079,768 | 1/1992 | Flammer | 375/1 X |
| 5,121,408 | 6/1992 | CAI et. al. | 375/1 |

OTHER PUBLICATIONS

R. C. Dixon, *Spread Spectrum Systems;* (John Wiley & Sons; 1984; pp. 223-226).

*Primary Examiner*—Bernarr E. Gregory
*Attorney, Agent, or Firm*—Michael Zelanka; James A. DiGiorgio

[57] ABSTRACT

A method for reducing the synchronization overhead in Frequency Hopping communication systems. Generally, the method establishes a synchronization state during which a plurality of communications can take place without re-synchronization before each separate transmission. More particularly, the method establishes a synchronization period during which all the radios are initially synchronized, followed by a series of acknowledgment period and transmission periods during which any unit intending to transmit is assigned a specific time slot for such transmission.

2 Claims, 1 Drawing Sheet

METHOD FOR REDUCING SYNCHRONIZING OVERHEAD OF FREQUENCY HOPPING COMMUNICATIONS SYSTEMS

GOVERNMENT INTEREST

The invention described herein may be manufactured, used, and licensed by or for the Government of the United States of America for governmental services without the payment to us of any royalty thereon.

FIELD OF THE INVENTION

This invention relates generally to Frequency Hopping (FH) radio data communications, and more specifically to a method for reducing the synchronizing time of FH communications systems, and thus increasing channel throughput.

BACKGROUND OF THE INVENTION

Presently, there is much activity in the development of spread spectrum communications systems in both the commercial and military arenas. A spread spectrum communication system is a system in which a plurality of communication units (radios) communicate with each other over a wide band of frequencies within a single communications channel. As a result, no one frequency is dedicated to any one communication network. This frees-up air-space so that a greater number of systems can use the limited number of available frequencies for communication over the air. Consequently, spread spectrum systems provide a more economical solution for over-the-air multiple access communications.

One technique for implementing spread spectrum communications is frequency hopping. In a frequency hopping system, the carrier frequency shifts from frequency to frequency in a predetermined pseudo-random pattern throughout the spectrum of the communication channel at predetermined times, based on the network clock. The network clock is established when the local clocks of all the units communicating on the channel are substantially synchronized to the same time. Without this local clock synchronization or network time, the units communicating on the channel will not hop to next frequency at the same time, and thus will lose communication with each other.

Essentially, frequency hopping acts as a time-frequency coding technique that provides a high degree of protection from frequency jamming as well as protection from eavesdropping on the communications channel. As a result, its success is directly dependant on the accuracy of the network timing. Since the network time is based on the local clocks of all the units communicating on the channel, it is not dependant or linked to the actual time of day.

One method of establishing and maintaining an accurate network time between the units communicating on the channel is disclosed in U.S. Pat No. 5,121,408, entitled "Synchronization For Entry To A Network In A Frequency Hopping Communication System," issued Jun. 9, 1992, to Cai et al, and incorporated herein by reference. Cai et al discloses a synchronization arrangement in which each unit on the network is initially synchronized to the same time or initial network time. As communications take place, each unit continually tracks its local clock deviation from that of the network time, making any corrections necessary to maintain synchronicity between its local clock and the network clock. As a result, each time a unit begins to transmit on the network all the member units must resynchronize with each other.

Consequently, this synchronization process, which is inherent to all present day FH communications systems, significantly limits the rate of interactive communications on the channel. Every time the channel is invoked, the transmitter and receiver must be synchronized, taking away from the available time for transmitting the actual data. Moreover, units intending to use the channel will incur a channel access delay to insure that the channel is free and to avoid colliding with other units communicating or waiting to communicate on the channel. As a result, these synchronization and channel access delays occupy valuable channel time and become a limiting factor in channel throughput.

One system in which this re-synchronization protocol is a great burden is the United States Army's Single Channel Ground and Airborne Radio System (SINCGARS). In the SINCGARS system, the transmitter sends a re-synchronizing signal over the channel before each transmission. Since typical communications on the SINCGARS system involves many data packets having a short duration compared to the re-synchronization time, the re-synchronizing overhead can monopolize a large percentage of the air time. As a result, the SINCGARS throughput, and thus communications are severely burdened.

SUMMARY OF THE INVENTION

Accordingly, the present invention provides a method for substantially reducing the synchronization overhead for FH communications systems, thereby increasing system throughput. To attain this, the present invention contemplates generating a synchronization state during which multiple transmissions can take place without the need for resynchronization before each transmission on the channel.

In general, the present inventive method provides an initial one-time synchronization period followed by a series of acknowledgement periods and transmitting periods which repeat until there are no more requests for transmission from the radios or member units communicating on the channel. More specifically, a member unit intending to initiate data exchange on the channel, called an initiating radio, first transmits a brief synchronization signal to all the other radios on the network during a one-time synchronization period. This synchronization signal prepares all the member units, including the initiating radio, for a coordinated data exchange.

The coordinated data exchange is set up and executed during a series of acknowledgement and transmitting time periods that follow the one-time synchronization period. More specifically, immediately following the synchronization period is an acknowledgement period during each member unit intending to transmit on the channel sends a brief response to the initiating radio. The brief response, which is sent in a predetermined sequence confirms that a successful synchronization has been established, and indicates that the acknowledging unit intends to transmit on the channel. As a result, each member unit that transmitted an acknowledgement signal during the acknowledgement period is assigned a data transmission time slot in a sequence of transmitting time slots that immediately follow the acknowledgment period. Consequently, during the sequence of assigned transmitting time slots, called the data transmission period, each assigned unit transmits its data on the channel.

After the last assigned time slot has expired, a new acknowledgement period begins without re-synchronization of the network. As long as at least one member unit transmits a brief acknowledgement signal during the new acknowledgement period the transmitting period will be repeated. As a result, the synchronization state is maintained until there are no more requests for transmission during the acknowledgement period. When the synchronization state is finally ended, a new synchronization state can be established any time thereafter by another member unit acting as an initiating radio as described above. Thus, the FH system synchronization overhead is greatly reduced, especially for FH systems such as SINCGARS where many data packets of a short duration with respect to the sync time are common protocol. The inventive method thereby overcomes, to a large extent, the problems that have beset the synchronization methods of prior art FH communications systems.

These and other features of the invention are described in more complete detail in the following description of the preferred embodiment when taken with the drawings. The scope of the invention, however, is limited only by the claims appended hereto.

DETAILED DESCRIPTION OF THE INVENTION

Figure 1:
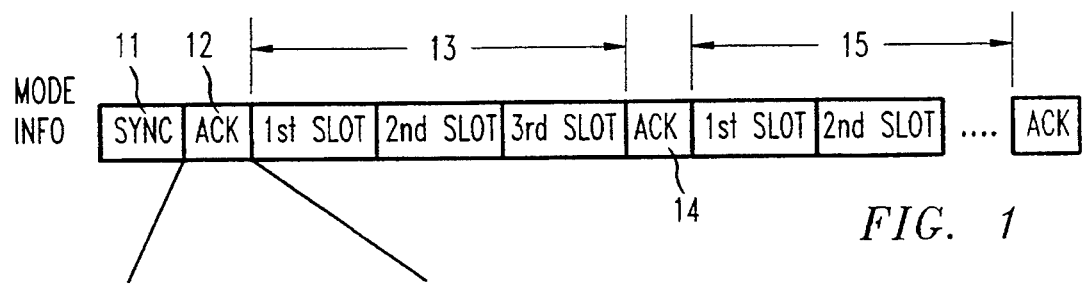
FIG. 1 is a timing diagram of the synchronization state of the inventive method described herein.

Referring now to the drawings, there is shown in FIG. 1 a timing diagram of the synchronization state of the inventive method described herein. As shown, the synchronization state has a one-time synchronization period 11 followed by an acknowledgement period 12 and a series of time slots comprising a transmission period 13 which together can be repeated indefinitely, as shown by the successive acknowledgment period 14 and successive transmission period 15.

Figure 2:
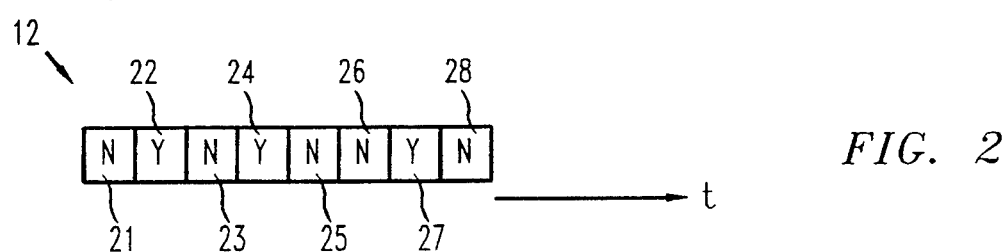
FIG. 2 is an expanded view of the acknowledgement period in the timing diagram shown in FIG. 1.

An expanded view of acknowledgement period 12 is shown in FIG. 2. As shown, each unit communicating on the network has its own predetermined acknowledgement time slot 21-28 within acknowledgement period 12 during which it either requests or declines to be assigned a transmission time slot during transmission period 13. Note, however, that the acknowledgement period is not limited to eight slots 21-28, it can be expanded to cover any predetermined number of network units that wish to communicate on the channel.

As shown in FIG. 2, an "N" response indicates that the network unit which was assigned that acknowledgement time slot within 21-28 does not request to be assigned a transmission time slot during transmission period 13, whereas a "Y" indicates that such a transmission time slot is requested. Since each network unit is given complete autonomy over all transmissions on the channel during its preassigned acknowledgement time slot 21-28, the network insures that no false acknowledgements or requests for transmission will occur.

Figure 3:
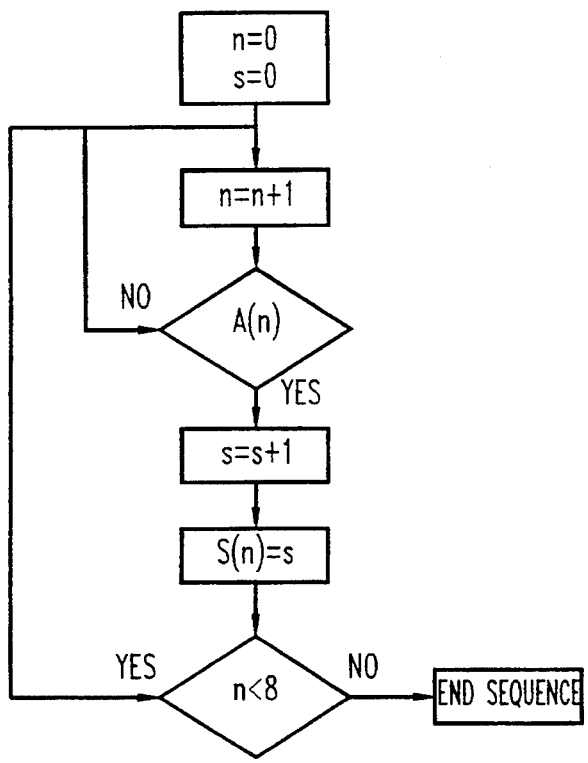
FIG. 3 is a block diagram of the scheduling for the transmitting time slot sequence shown in FIG. 1.

The logistics of the scheduling of assignments for the transmission period time slots during transmission period 13 is shown in FIG. 3 In FIG. 3, "n" represents the network unit's identification number, "s" represents the actual time slot within transmission period 13, A(n) represents the type of acknowledgement ("Y" or "N" as described above) transmitted by network unit number "n" during its predetermined slot 21-28 during acknowledgement period 12, and S(n) represents the assigned transmission slot within transmission period 13 for that network unit number "n". As shown, only those network units that transmit a "Y" acknowledgement signal during the acknowledgement period 12 are assigned a transmission time slot during transmission period 13. As a result, the size of transmission period 13 is dynamic and directly dependent on the number of units intending to transmit on the channel (i.e. those who transmit a "Y" during the acknowledgement period 12). In addition, since only the network units that request a transmission time slot are assigned such a slot, the system's synchronization overhead is minimized and the channel throughput is optimized. Moreover, as described above, the overall network time drift is substantially minimized.

In operation, a member unit initiates the synchronization state by sending a synchronizing signal on the channel, thus establishing synchronizing period 11. Immediately thereafter, during acknowledgement period 12, each member unit intending to transmit on the channel sends an acknowledgment signal during its predetermined time slot. Each unit that sends an acknowledgement signal is assigned a transmission time slot within transmission period 13 during which it has complete autonomy to transmit its data.

After the last assigned time slot in transmission period 13 has expired, a new acknowledgment period begins without resynchronization of the network. As long as at least one member unit sends an acknowledgement signal during a subsequent acknowledgment period (not shown), subsequent transmitting time slots will be assigned, and thus a subsequent transmission time period (not shown) established. As a result, the synchronization state is maintained until there are no more requests for a transmission time slot during the acknowledgement period. A new synchronization state can be initiated, however, at any time thereafter by repeating the steps described above. Thereby overcoming, to a large extent, the synchronization overhead problems associated with the prior art.

What is claimed is:

1. An efficient method for establishing communications between member units on a frequency hopping communications system having a predetermined communications channel, comprising the steps of:

a. transmitting synchronization information from an initiating member unit to the remaining remote member units, said synchronization information synchronizing the remote member units with said initiating member unit.;

b. transmitting a transmission request from the remote member units to said initiating member unit to indicate which Of the remote member units have successfully synchronized with said initiating member unit and which member units intend to transmit on the frequency hopping communications channel, each said transmission request transmitted during an acknowledgement time period having a sequence of time slots, each member unit having a predetermined time slot within said acknowledgement time period during which said transmission request is transmitted;

c, assigning a transmission time slot within a transmission time period to each of the member units that transmitted said transmission request during said acknowledgement period, said transmission time period immediately following said acknowledgement time period;

d. transmitting information from the member units assigned said transmission time slots on the communications channel during said transmission time period;

e. repeating steps b-d until no member units transmit said transmission request during said acknowledgement period.

2. The method of claim 1 wherein the frequency hopping communications system is the United States Single Channel Ground and Airborne Radio System.

* * * * *